Reissued July 6, 1943

Re. 22,342

UNITED STATES PATENT OFFICE 22,342

CLEANUP AGENT

John D. McQuade, Lakewood, Ohio, assignor to Kemet Laboratories Company, Inc., a corporation of New York No Drawing. Original No. 2,253,862, dated August 26, 1941, Serial No. 190,583, February 15, 1938. Application for reissue August 26, 1941, Serial No. 408,405

5 Claims. (Cl. 250—27.5)

This invention relates to clean-up agents used in producing a high vacuum. More particularly, it refers to improvements in clean-up agents of the type employed in the manufacture of thermionic valves such as radio tubes.

High vacua are commonly produced in radio tubes by pumping most of the gas out of the envelope of the tube and subsequently increasing the vacuum thus obtained by vaporizing or "flashing" within the envelope a highly reactive substance or "getter material" which adsorbs or reacts with residual gases. Usually, this material consists principally of a comminuted mixture or comminuted alloy of active metals such as barium, magnesium, and aluminum. The mixture is ordinarily formed into a small tablet or pill and attached to a holder or getter tab, for example by pressing or embedding the tablet into a small strip of metal. When such getter material is flashed, there is a marked tendency for unvaporized, molten particles to be violently expelled from the mass of the material. Some of these particles strike the envelope of the tube with considerable force, and if the envelope is made of glass, the impact between these hot particles and the relatively cold glass may cause the latter to crack. Moreover, loose metallic particles within the tube interfere with its proper performance.

Attempts have been made to prevent the escape of such metallic particles from the flashed getter material by covering the getter tablet with screens or shields of various designs, but no completely effective device of this kind has been developed.

The principal object of the present invention is to avoid these disadvantages which are inherent in getter materials of the kind described. This object is attained by providing a new and improved getter material which when flashed vaporizes smoothly and without sputtering.

In its general aspect, the invention comprises an active getter material in admixture with an effective amount of a comminuted refractory material which is relatively inert under flashing conditions, will not react to a substantial extent with the active getter material and is relatively nonvolatile at flashing temperatures, ranging usually between 850° and 1150° C. Substances suitable for this purpose include refractory oxides and refractory metals such as alumina, silica, magnesia,, molybdenum, or tungsten or mixtures thereof. Among these, alumina is the most effective.

The amount of the refractory material preferably is between 3% and 20% of the total weight of the mixture. Within this percentage range, the optimum quantity of refractory material depends on its composition as well as on the kind of active getter material. For example, an addition of about 7% by weight of alumina was found to give best results with an active getter material consisting of a barium-aluminum-magnesium alloy, while an addition of about 10% by weight of alumina is best when using an active getter material consisting of an alloy of barium and magnesium only.

The refractory material preferably is finely powdered and thoroughly mixed with powdered active material and the mixture may be pressed to form tablets or pills. These may then be embedded or otherwise attached to a getter tab or other suitable holder.

Extensive experiments have shown that the violence of vaporization of the getter material is appreciably decreased and that the deleterious ejection of metallic particles is avoided.

I claim:

1. Clean-up agent, for thermionic valves and the like, composed of comminuted active getter alloy of barium and magnesium intimately admixed with from 3% to 15% by weight of comminuted refractory oxide which under flashing conditions is inert, non-volatile, and acts to decrease the violence of vaporization of such alloy.

2. Clean-up agents, for thermionic valves, composed of comminuted active getter alloy of barium and magnesium and from 7% to 15% by weight of at least one comminuted refractory oxide selected from the group consisting of alumina, silica, and magnesia which under flashing conditions is substantially inert and non-volatile.

3. Clean-up agents, for thermionic valves, composed of comminuted active getter alloy of barium and magnesium and from 7% to 15% by weight of comminuted alumina.

4. Clean-up agents, for thermionic valves, composed of comminuted active getter alloy of barium and magnesium and from 7% to 15% by weight of comminuted silica.

5. Clean-up agents, for thermionic valves, composed of comminuted active getter alloy of barium and magnesium and from 7% to 15% by weight of comminuted magnesia.

JOHN D. McQUADE.